United States Patent [19]
Balhadere et al.

[11] Patent Number: 5,853,821
[45] Date of Patent: Dec. 29, 1998

[54] METHOD OF PROTECTING A PART MADE OF A CARBON-CONTAINING COMPOSITE MATERIAL AGAINST OXIDATION

[75] Inventors: Aline Balhadere, Vendays Montalivet; Jacques Thebault, Bordeaux; Bruno Bernard, Pessac, all of France

[73] Assignee: Societe Europeenne de Propulsion, Suresnes, France

[21] Appl. No.: 857,434

[22] Filed: May 16, 1997

Related U.S. Application Data

[63] Continuation of Ser. No. 429,816, Apr. 27, 1995, abandoned.

[30] Foreign Application Priority Data

Nov. 4, 1994 [FR] France ................................... 94 13179

[51] Int. Cl.$^6$ ........................................................ B06B 1/20
[52] U.S. Cl. ........................... 427/601; 427/299; 427/314; 427/348; 427/372.2; 427/419.1; 427/443.2; 427/560
[58] Field of Search ..................... 427/560, 601, 427/299, 314, 348, 372.2, 419.1, 443.2

[56] References Cited

U.S. PATENT DOCUMENTS

| | | | |
|---|---|---|---|
| 3,351,477 | 11/1967 | Wallouch | ................................... 106/56 |
| 4,292,345 | 9/1981 | Kolesnik et al. | ........................ 427/113 |
| 4,439,491 | 3/1984 | Wilson | ..................................... 428/408 |
| 5,039,550 | 8/1991 | Malghan et al. | ........................... 427/57 |

FOREIGN PATENT DOCUMENTS

| | | |
|---|---|---|
| 0606851 | 7/1994 | European Pat. Off. ........ C04B 41/50 |
| 2685694 | 12/1991 | France . |
| 56-109878 | 8/1981 | Japan . |
| 01111774 | 4/1989 | Japan . |

*Primary Examiner*—Bernard Pianalto
*Attorney, Agent, or Firm*—Weingarten, Schurgin, Gagnebin & Hayes LLP

[57] ABSTRACT

Prior to applying an impregnation composition constituted by a solution of at least one phosphate, a part made of composite material is treated in depth by means of an aqueous solution that penetrates into the open internal pores of the composite material, and is then dried. The aqueous solution contains an additive which, after drying, imparts to the composite material, increased wettability by the impregnation composition. The additive contained in the aqueous solution is preferably constituted by at least one wetting agent that is soluble in water and non-ionic, such as an oxyethylenated fatty acid, an oxyethylenated fatty alcohol, an oxyethylenated alkyl-phenol or an ester of a high polyol.

14 Claims, 1 Drawing Sheet

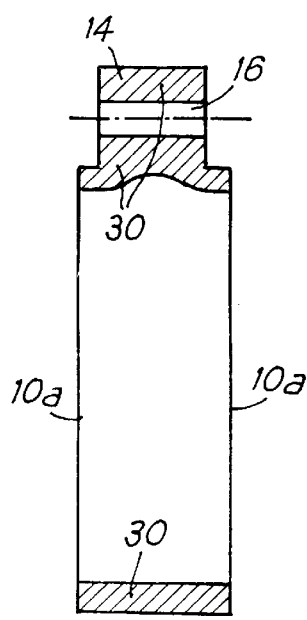
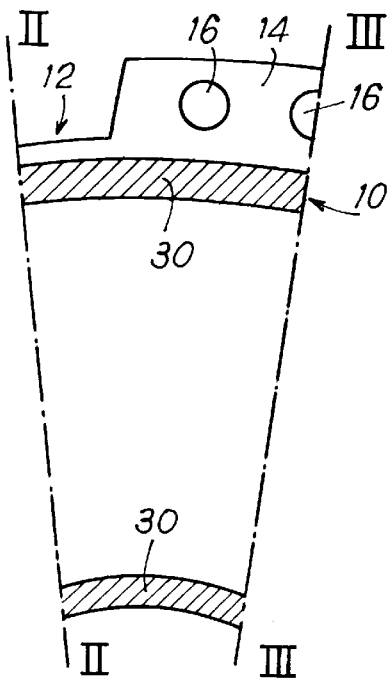
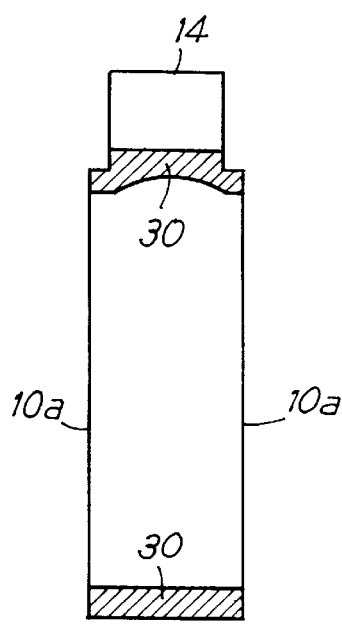
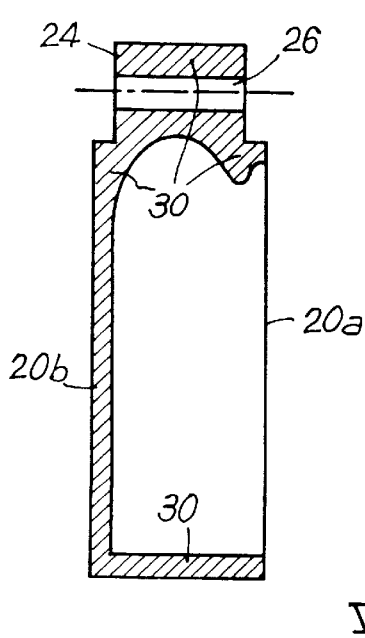
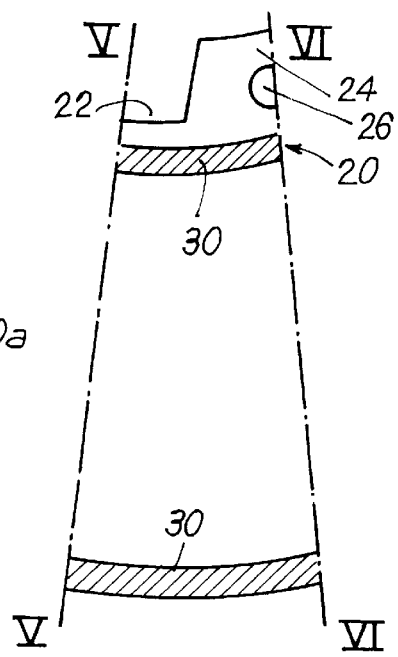
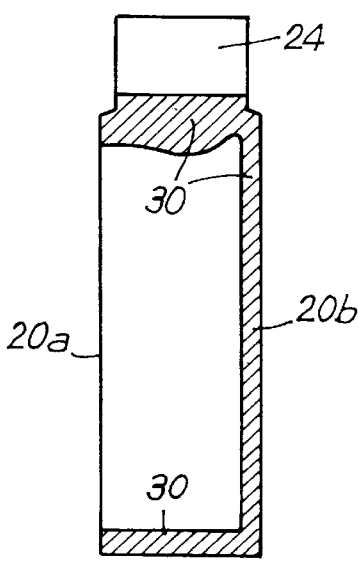

METHOD OF PROTECTING A PART MADE OF A CARBON-CONTAINING COMPOSITE MATERIAL AGAINST OXIDATION

This application is a continuation of application Ser. No. 08/429,816, filed Apr. 27, 1995, abandoned.

The present invention relates to protecting parts made of carbon-containing material against oxidation.

The composite materials concerned are, in particular, materials constituted by fiber reinforcement that is densified by a matrix, and in which carbon is present in the fibers, in the matrix, and/or in a matching layer or "interphase" between the fibers and the matrix. Such composite materials are, in particular, thermostructural composite materials in which the fiber reinforcement and the matrix are made of carbon or of ceramic with an interphase of boron nitride or of pyrolytic carbon optionally being interposed between the fibers and the matrix. Such materials are characterized by their good mechanical properties. When they contain carbon, their ability at conserving such properties for long periods of time at high temperature depends on the presence of effective protection against oxidation. This applies even when carbon is present only in a pyrolytic carbon interphase between ceramic fibers and a ceramic matrix. Unfortunately, whatever the method used for making thermostructural materials, e.g. liquid densification which consists in impregnating the fiber reinforcement with a liquid precursor and subsequently transforming the precursor by heat treatment, or densification by chemical vapor infiltration, the resulting materials always present residual internal pores that are open and that provide oxygen in the surroundings with access to the core of the material.

One particular, but non-limiting, field of application where carbon-containing composite materials are liable to oxidize while in use, is the field of brake disks, e.g; the disks of aircraft brakes made of carbon-carbon composite material (carbon fiber reinforcement densified by a carbon matrix).

A well known method of protecting a material containing carbon against oxidation consists in forming a coating that provides a barrier to the oxygen in the surroundings.

With porous materials, effective protection against oxidation is obtained when the protective barrier is anchored within the internal pores of the material, i.e. when it lines the walls of the pores that are accessible from the outside (the real surface of the material), and is not constituted merely by a coating on the outside surface (the apparent surface of the material).

It is known that effective protection against oxidation of porous materials that contain carbon can be achieved by impregnating the materials with aqueous phosphate solutions, followed by a drying operation. The phosphates may be simple phosphates such as phosphates of magnesium, aluminum, calcium, zinc, etc. optionally associated with phosphoric acid at various dilutions. Phosphate complexes may also be effective, e.g. a phosphate complex of aluminum and of calcium.

A particular advantage of phosphates lies in their ability to oppose the effect of agents that catalyze the oxidation of carbon. It is well known that the reaction between carbon and oxygen can be accelerated by the presence of certain elements, such as the alkalis and the alkaline-earths, inserted by or coming from sodium chloride (sea water), potassium acetate, . . . , for example. These oxidation catalysts may be impurities brought in from the surroundings (pollution, clogging, exposure to marine conditions, . . . ) or they may be impurities coming from a fabrication process, e.g. residues from carbon fiber fabrication (oiling substances or precursors added for weaving purposes, . . . ).

Phosphates are therefore good candidates for providing internal anti-oxidation protection within porous materials containing carbon, and methods including the impregnation of such materials by compounds suitable for leaving a phosphate-based coating on the walls of pores that are accessible from the outside are described in the following documents in particular: U.S. Pat. No. 3,351,477, U.S. Pat. No. 4,292,345, FR-A-2 685 694, and U.S. Pat. No. 4,439,491.

Document U.S. Pat. No. 3,551,477 recommends using an impregnation composition constituted by a relatively concentrated aqueous solution, with the requirement that the precursors of the phosphate coating to be obtained are inserted in a particular order. Thus, the precursors are put into solution starting with phosphoric acid whose presence makes it possible to dissolve the other precursors.

Document U.S. Pat. No. 4,292,345 proposes impregnation in a plurality of steps, beginning with orthophosphoric acid, which is dried, followed with a solution of an organic compound that is capable, after being raised in temperature, of reacting with the acid to form phosphates.

Document FR-A-2 685 694 discloses a method comprising impregnating a composite material with a solution of sodium and potassium phosphates, followed by drying and heat treatment in order to form an internal protection that lines the walls of the open pores in the material.

Document U.S. Pat. No. 4,439,491 describes a method of protecting carbon or graphite against oxidation by applying an aqueous solution of ammonium phosphate, zinc orthophosphate, phosphoric acid, boric acid, and cupric acid. A wetting agent is added to the solution.

The purpose of using a wetting agent is to facilitate penetration of the composition into the open internal pores of the composite material. The wettability of carbon by water or by an aqueous solution is variable. It depends on numerous parameters including the nature of the carbon (graphite, resin coke, pitch coke, pyrolytic carbon, vitreous carbon, . . . ) and also on the physiochemical treatments it has received, such as high temperature treatment (at more than 1200° C. for graphitizing) or oxidizing electrochemical or chemical treatments. The wetting agent must be compatible with the aqueous phosphate solution which is very acid, and it must not spoil the uniformity and the stability of the solution.

Obtaining effective internal protection in durable manner requires a relatively large quantity of phosphates to be inserted, and thus the use of aqueous solutions that are concentrated.

The Applicant has observed that such highly concentrated aqueous solutions, even when they have a wetting agent added thereto, have difficulty in penetrating to a depth of more than 1 mm in carbon-carbon materials of the type used for brake disks. The reason is very probably associated with the viscosity of such solutions and with the poor wettability by water of carbons that are incompletely graphitized. The resulting protection is therefore more like an external or surface protection than an internal protection anchored within the bulk of the material. In addition, in the case of brake disks, the Applicant has observed that the presence of too great a quantity of phosphates at the friction surfaces significantly reduces the friction characteristics.

Thus, an object of the present invention is to provide a method enabling a carbon containing composite material to be impregnated in depth, inside its open internal pores, using a composition that contains a concentrated solution of phosphates suitable for forming effective protection against oxidation and that is anchored within the volume of the material and not only at its surface. The invention also seeks to provide a method enabling the impregnating composition to penetrate into the material in controlled manner so as to ensure that the protection achieved is as intended and reproducible.

According to the invention, this object is achieved by the fact that prior to the step of applying the impregnation composition, the method comprises prior steps of in-depth treatment of the part made of composite material by means of an aqueous solution that penetrates into the open internal pores of the composite material, and of drying the aqueous solution, which solution contains an additive that, after drying, imparts to the composite material, increased wettability by the impregnation composition.

Preferably, the additive contained in the aqueous solution is constituted by at least one wetting agent that is soluble in water and that is non-ionic, such as an oxyethylenated fatty acid, an oxyethylenated fatty alcohol, an oxyethylenated alkyl-phenol, or an ester of a high polyol. It is also desirable to avoid using an additive that is liable to leave in the composite material any residue that catalyses the oxidation of carbon.

In quite remarkable manner, the pretreatment of parts made of composite material by means of an aqueous solution containing an additive which, after drying, improves the wettability of the material, has made in-depth penetration possible when using impregnation compositions in the form of concentrated phosphate solutions, thereby giving rise to the formation of internal protection extending over a relatively large thickness, e.g. 2 mm to 10 mm, with this being done in a manner that is controllable, uniform, and reproducible.

The aqueous solution used for the pretreatment may be very fluid and can penetrate easily into the core of the material, the additive being added to water at a concentration that preferably represents 0.05% to 5% by weight of the water.

Such an improvement in in-depth wettability cannot be obtained in the same manner when the wetting agent is incorporated in a concentrated impregnation solution whose viscosity limits its ability to penetrate into the material.

The impregnation composition based on polyphosphate is applied to the surface of the part made of composite material under atmospheric pressure, e.g. by spraying or by painting on with a brush. It is not necessary to make use of high pressure or a vacuum to force the impregnation composition to penetrate deeply under the effect of a pressure difference. In addition, the impregnation composition is easily applied selectively on certain portions only of the part.

Advantageously, the treatment with the aqueous solution containing the wetting agent is also performed to clean the part made of composite material. Because, in some cases, in-depth cleaning by means of water is necessary in any event, in particular for eliminating dust or machining debris that may have accumulated in the internal pores, implementing the invention does not require any additional operation to be performed since it suffices to add the additive to the cleaning water.

Examples of the method of the invention are described below in the context of its application to anti-oxidizing treatment for aircraft brake disks made of carbon-carbon composite material.

BRIEF DESCRIPTION OF THE DRAWING

In the accompanying drawing:

FIG. 1 is a front view of a sector of a rotor brake disk made of carbon-carbon material and provided with internal anti-oxidation protection by a method of the invention;

FIG. 2 is a diagrammatic side elevation view on radial plane II—II of FIG. 1;

FIG. 3 is a diagrammatic side elevation view on radial plane III—III of FIG. 1;

FIG. 4 is a front view of a sector of a stator brake disk made of carbon-carbon material and provided with anti-oxidizing protection by a method of the invention, the disk being intended for placing at one end of a set of stator and rotor disks forming an aircraft multi-disk brake;

FIG. 5 is a diagrammatic side elevation view on radial plane V—V of FIG. 4; and

FIG. 6 is a diagrammatic side elevation view on radial plane VI—VI of FIG. 4.

EXAMPLE 1

An aircraft multi-disk brake rotor disk was made of carbon-carbon composite material by forming a fiber preform made up of two-dimensional plies that were bonded together by needling, by densifying the preform with a carbon matrix formed by chemical vapor infiltration, and by machining the disk to its final shape and dimensions.

As shown in FIGS. 1 to 3, the disk 10 had notches 12 in its periphery for co-operating with fluting in a sleeve that is constrained to rotate with a wheel on which the brake is to be mounted. The crenellations 14 between the notches had holes 16 for fastening metal brackets.

The disk made in this way was immersed in an ultrasound tank containing water having added thereto 0.5% by weight of "Marlophen 89" sold by the German firm Hüls and based on alkylphenol polyethyleneglycol ether. The treatment of the disk in the aqueous solution served to clean it and to eliminate machining residues. The use of an ultrasound tank for this purpose is well known per se. Because of the high degree of fluidity of the aqueous solution, the treatment also served to insert "Marlophen 89" into all of the accessible pores of the composite material. The disk was then extracted from the aqueous solution bath and dried in an oven at about 100° C. for about 5 hours (h), leaving the walls of the pores in the material lined with "Marlophen 89".

An aqueous solution of aluminum dihydrogen phosphate $Al(H_2PO_4)_3$ at a concentration of 50% by weight was applied by brush onto the outside surfaces of the disk, including the walls of the holes 16, and excepting the friction surfaces 10a. Such a solution can be obtained from the U.S. firm Alfa and is sold in France by the French firm Biovalley under the name "aluminum dihydrogen phosphate 50%", or else it can be obtained from the French firm Rhone Poulenc and is sold in France by the French firm Eurofos under the name "phosphate monoaluminique". After a period of a few minutes that is required to allow the solution to penetrate into the pores of the material, a second layer was applied in the same manner and was allowed to stand for at least 30 minutes before beginning the drying operation.

Drying was performed in an oven in air in application of the following cycle:

|  | Rate of temperature rise (°C./min) | Pause duration (hours) |
| --- | --- | --- |
| 20° C. to 90° C. | — | 5 |
| 90° C. to 150° C. | 1° C./min | 3 |
| 150° C. to 220° C. | 1° C./min | 1 |
| 220° C. to 350° C. | 1° C./min | 1 |

After drying and returning to ambient temperature, the part was subjected to heat treatment in a furnace under a nitrogen atmosphere in application of the following cycle:

rise from 20° C. to 300° C. at a rate of 5° C./min;
rise form 300° C. to 700° C. at a rate of 2° C./min; and
pause for 5 h at 700° C.

After cooling, the disk was subjected to an oxidation test. A sector was cut from the disk and oxidized in air for 2 h at 650° C. after being "polluted" with an oxidation catalyst (potassium acetate). The zones having a high degree of protection against oxidation, i.e. the zones where the aluminum dihydrogen phosphate had penetrated deeply were thus shown up.

The result of the test is reproduced in FIGS. 1 to 3, where the zones 30 in which the protection had penetrated are shaded. This test shows the depth and the uniformity of protection penetration. The average depth was about 6 mm with a minimum lying in the range 2 mm to 3 mm and a maximum lying in the range 10 mm to 11 mm. The outside surface of the protected (painted) zones was still in its initial state. No fragments had become detached (no dust formation) and no loss was visible at the sharp edges of the disk.

EXAMPLE 2

The process of Example 1 was implemented on a stator disk 20 made of carbon-carbon composite material and having substantially the same dimensions as the rotor disk 10. The disk 20 (FIGS. 4, 5, and 6) had an inside ring with notches 22 designed to co-operate with fluting on a fixed hub. The crenellations 24 between the notches had holes 26 for fastening to metal brackets.

In this example, the disk 20 was an end disk designed to be placed at one end of a set of rotor and stator disks of an aircraft multi-disk brake. The disk 20 had a single friction face 20a, its opposite face 20b being a thrust face.

After initial treatment as in Example 1, the impregnation composition of Example 1 was applied to all of the surfaces of the disks, including its thrust face 20b, but excepting its friction face 20a.

FIGS. 4, 5, and 6 show the zones 30 into which the protection penetrated, as revealed after the oxidation test. The thrust face 20b was protected to a uniform thickness of about 4 mm, which is a little less than in the other zones. Since the fibers of the fiber reinforcement in the composite material extend parallel to the faces of the disk, they do not facilitate in-depth penetration of the impregnation composition. Nevertheless, this example shows that a considerable depth was obtained, confirming the ability of the method of the invention to apply effective protection regardless of the orientation of the fibers in the composite material.

It will be understood that with the invention protection remains restricted to an "external" zone of the disk and more particularly does not pass right through the thickness of the disk. The fact that penetration is controlled in this way avoids the protection passing through the disk to disturb and reduce the tribological characteristics of the material on its opposite, friction face.

EXAMPLES 3, 4, 5

The procedure was the same as in Example 1, but the rotor disk was replaced by test pieces in the form of small rectangular bars (20×25×30 mm), and different concentrations by weight of "Marlophen 89 " were used during the pretreatment of the test pieces:

Example 3: 0.05% by weight relative to the weight of water;

Example 4: 0.5%;
Example 5: 5%.

After the test pieces had been cut and oxidized, protection was observed to have a thickness lying in the range 4 mm to 6 mm on average, being increased a little as a function of additive concentration, with the increase being more significant on going from 0.05% to 0.5%, than on going from 0.5% to 5%.

EXAMPLES 6, 7, 8

The procedure was the same as in Example 1, but the rotor disk was replaced by test pieces in the form of small rectangular bars (20×25×30 mm) and the "Marlophen 89 " was replaced with the following additives at a concentration of 1% by weight:

Example 6: a wetting agent sold under the name "BYK 181" by the German firm BYK Chemie, based on an alkylene ammonium salt of a polyfunctional non-ionic polymer;

Example 7: a wetting agent sold under the name "BEYCOSTAT C213" by the French firm CECA Gerland, based on a phosphoric ester; and Example 8: a wetting agent produced under the name "EMPILAN KAS/90" by the firm Albright & Wilson Detergents Group, sold in France by the firm SCPI, and based on a non-ionic linear $C_{10}$–$C_{12}$ pentaoxyethylenated fatty acid.

After the test pieces had been cut and oxidized, the protected thicknesses were observed to lie in the range 3 mm to 8 mm, depending on the additive used.

These examples show that the method of the invention can be implemented using aqueous solutions for pretreatment of the parts, which solutions can be made by dissolving various substances known for their effectiveness as wetting agents or surfactants, with the substances being preferably selected to avoid leaving residues within the material that catalyze oxidation of carbon.

Although Examples 1 and 2 relate to aircraft brake disks made of carbon-carbon composite material, the method of the invention is applicable to another kinds of part, whether they are made of carbon-carbon composite material, or more generally, of any composite material that contains carbon, e.g. a ceramic matrix composite such as a C/SiC composite (carbon fiber reinforcement and silicon carbide matrix).

We claim:

1. A method for the protection against oxidation of a part made of a composite material containing carbon and presenting open internal residual pores, said method comprising the steps of:

in-depth treating a part made of a composite material by introducing an aqueous solution into open internal pores of the composite material, the aqueous solution including a wetting agent, drying the part to leave a deposit of said wetting agent in the internal pores of the composite material, thereafter impregnating the part with an impregnation composition comprising a solution of at least one phosphate, said wetting agent deposit imparting to the composite material increased wettability by the impregnation composition to allow substantial in-depth penetration of the impregnation composition into the internal pores of the composite material, and heat-treating the impregnated part to obtain an internal phosphate type protection against oxidation that is substantially anchored within the volume of the composite material.

2. A method as claimed in claim 1, comprising simultaneously cleaning the part made of the composite material by said in-depth treating step.

3. A method as claimed in claim 2, wherein said in-depth treating and simultaneous cleaning step is carried out by immersing the part of the composite material into a bath of said aqueous solution of wetting agent and applying ultrasound energy thereto.

4. A method as claimed in claim 1, wherein the impregnation composition is applied to the surface of the part under atmospheric pressure.

5. A method as claimed in claim 4, wherein the impregnation composition is applied by being painted on the part.

6. A method as claimed in claim 1, wherein the proportion of wetting agent added to water to form the aqueous solution lies in the range of 0.05% to 5% by weight of the water.

7. A method according to claim 6, wherein the impregnation composition is applied to the surface of the part under atmospheric pressure.

8. A method according to claim 7, wherein the impregnation composition is applied by being painted on.

9. A method according to claim 8, comprising simultaneously cleaning the part made of the composite material by said in-depth treating step.

10. A method according to claim 9, wherein said in-depth treating and simultaneous cleaning step is carried out by immersing the part of the composite material into a bath of the aqueous solution of the wetting agent and applying ultrasound energy thereto.

11. A method as claimed in claim 1, wherein said wetting agent is selected from the group consisting in an oxyethylenated fatty acid, an oxyethylenated fatty alcohol, an oxyethylenated alkyl-phenol, and an ester of a high polyol.

12. A method according to claim 11, wherein the proportion of wetting agent added to water to form the aqueous solution lies in the range 0.05% to 5% by weight of the water.

13. A method according to claim 1, wherein the wetting agent is soluble in water.

14. A method according to claim 1, wherein the wetting agent is non-ionic.

* * * * *